C. SEYBOLD.
FRICTION CLUTCH.
APPLICATION FILED DEC. 29, 1919.
1,365,733.
Patented Jan. 18, 1921.
2 SHEETS—SHEET 2.
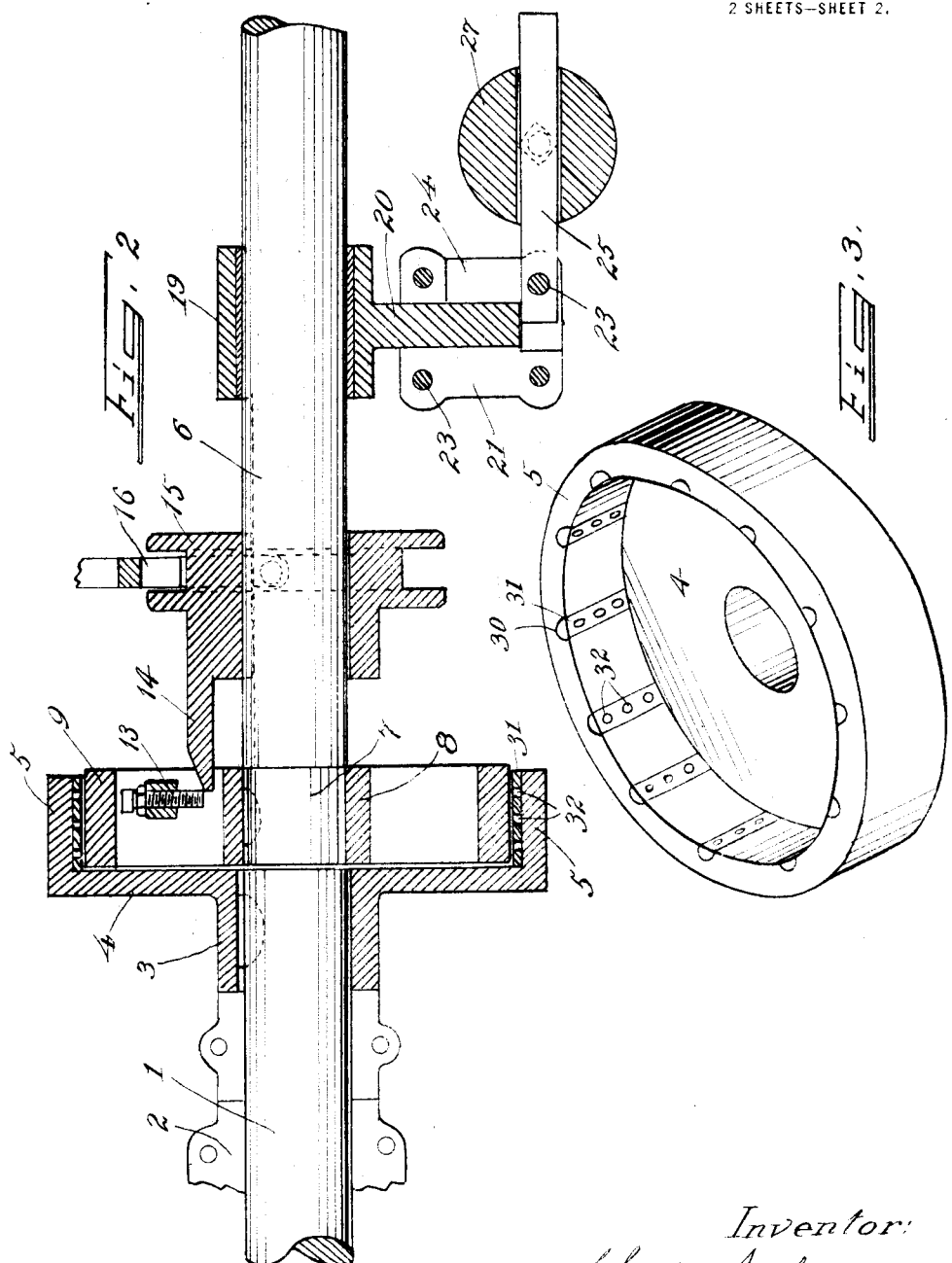
Inventor:
Charles Seybold
By
Allen & Allen
Attorneys.

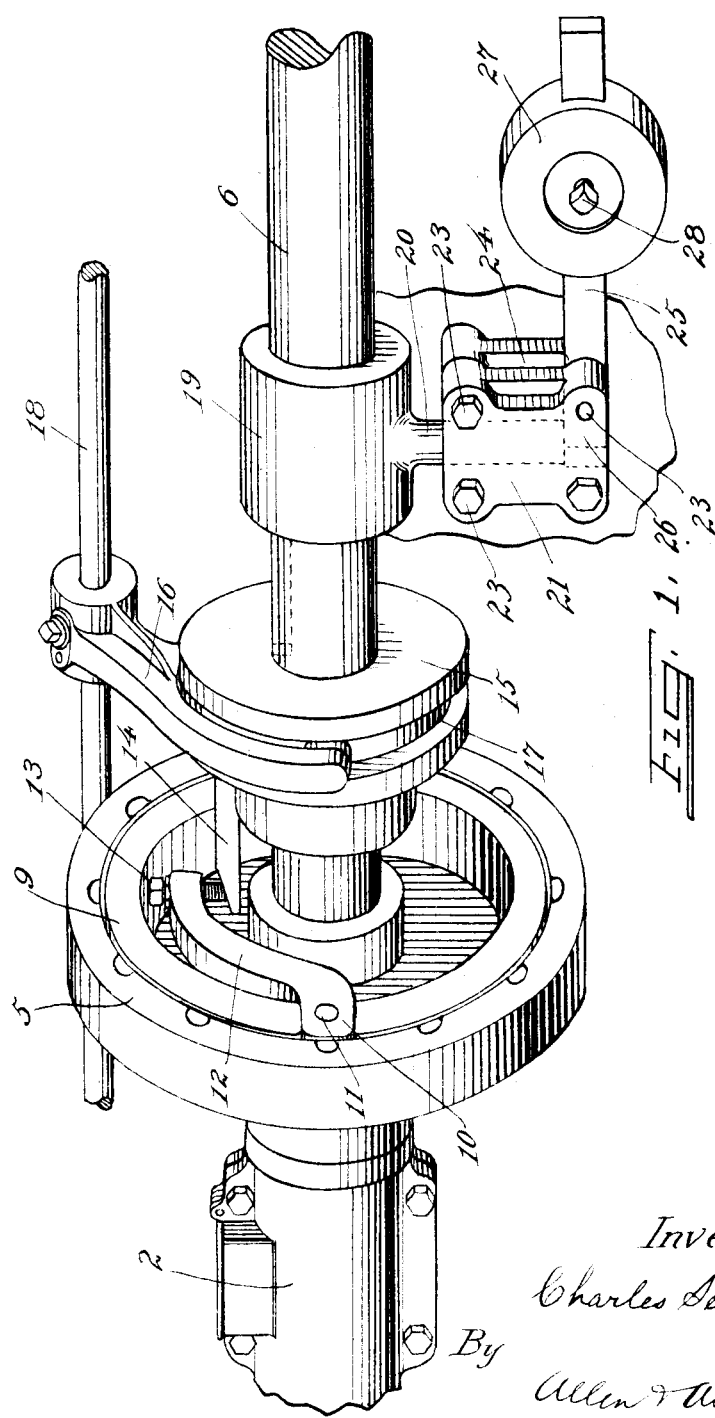

UNITED STATES PATENT OFFICE.

CHARLES SEYBOLD, OF DAYTON, OHIO.

FRICTION-CLUTCH.

1,365,733.  Specification of Letters Patent.  Patented Jan. 18, 1921.

Application filed December 29, 1919. Serial No. 348,048.

*To all whom it may concern:*

Be it known that I, CHARLES SEYBOLD, a citizen of the United States, and a resident of the city of Dayton, in the county of Montgomery and State of Ohio, have invented certain new and useful Improvements in Friction-Clutches, of which the following is a full, clear, and exact description, reference being had to the accompanying drawings, forming a part of this specification.

My invention relates to friction clutches for coupling together rotating shafts, pulleys and the like and it has to do with that class of friction clutches in which split or divided bands attached to one of the rotating members are expanded within the rim of the part secured to the other member to frictionally couple the two parts together.

My improved construction is particularly designed for use in connection with paper cutting machinery in which the outside flange, disk or wheel is secured to the short shaft carrying the fly wheel which is constantly running during the use of the machine, while the split expansion band is secured to the driven shaft of the machine.

In constructions of this kind, where one member is in constant rotation and the other member frequently thrown into and out of engagement, and the two shafts to be coupled together are mounted in fixed journal bearings, its engaging parts soon wear so that rim and band do not engage smoothly and evenly and it is a very difficult matter to maintain the centers of the two abutting shafts to be coupled in exact alinement.

It is the object of my invention to provide a construction in which the longitudinal center lines of the two shafts may be maintained in alinement, whereby the wear of the clutch members shall be at all times uniform.

I accomplish this result by that certain novel construction and arrangement of parts, to be hereinafter particularly pointed out and claimed, in which a floating journal bearing is provided for the driven shaft of the machine in order that the alinement of the driving and the driven members may be accurately maintained.

In the drawings,

Figure 1 is a perspective view of my improved clutch.

Fig. 2 is a central, longitudinal section of same.

Fig. 3 is a perspective view of the hub band within which the split band is expanded.

1 represents the fly wheel shaft of the machine provided with a journal bearing 2 in the frame work and carrying at its outer end the fly wheel of the machine, (not shown.) Mounted on, and keyed to the inner end of this shaft is the hub 3 of the disk 4 having a flanged periphery 5.

6 is the shaft to be coupled to the shaft 1, and on its inner end, at 7, is keyed the hub 8 of the divided expansion band 9. Inserted between the inner ends of this expansion band 9 is the block 10 mounted on the pin 11, so that the block can be rocked to expand the split band to frictionally clutch the flanged rim 5 of the other clutch member.

This block is provided with an arm 12 carrying at its outer end the set screw 13 arranged to be engaged by the beveled inwardly projecting pin or bar 14 carried by the sliding collar 15, keyed to slide on the shaft 6 and actuated by the fork 16, engaging in the annular groove 17 in the collar 15, the fork being shifted by the movement of the rod 18, controlled by a hand lever, not shown.

Instead of mounting the shaft 6 in a fixed journal bearing at its inner end, I provide for a floating bearing for this end of the shaft, the weight of the parts being balanced so as to maintain a true alinement for the driving and driven shafts.

The inner end of the shaft is mounted in a journal box 19 which is provided with a depending stem 20 arranged to slide in a suitable vertical aperture in a casting 21 bolted to the frame of the machine by the bolts 23. This casting 21 is provided with a recess 24 on one side in alinement with the stem 20 of the bearing, and the lever 25 is pivoted to the casting at the lower end of this opening on one of the retaining bolts 23.

The inner end 26 of this lever 25 extends under the stem 20 and the outer end of the lever carries a weight 27 which is adjustable along the length of the lever and is held in an adjusted position by the set screw 28.

The stem 20 of the journal box 19 is of such a length and the casting is so located that normally the lever 25 will support the stem of the journal box in such a position that the shaft 6 will be in true alinement with the shaft 1, and the weight 27 is of such a size as accurately to balance the weight of the inner end of the shaft 6 and the journal box and friction clutch devices. The weight 27 is adjusted so that the split band 9 will fit accurately within the band 5, with the two shafts in perfect alinement.

With the parts thus held in floating condition, the wear of the friction clutch is entirely uniform, and when the split band is disconnected from the flange 5, the flange will rotate uniformly and truly around the expansion band.

In order to keep the clutch properly oiled and to prevent the necessity of frequent renewal of lubrication, I cut a series of longitudinal grooves 30 in the inner contacting surfaces of the flange 5 and fill these grooves with blocks or plugs of wood 31, in which strips, holes 32 have been bored.

These wooden plugs and the openings therein fill with lubricating grease and sufficient lubricant is retained so that it is only at very rare intervals that attention has to be given to the matter of lubrication.

While I have described my invention with special reference for use in certain classes of machinery, of course, it will be understood that the principle of the floating bearing can be employed in all situations where it is essential to maintain true alinement for a friction clutch construction of the character indicated.

Having thus described my invention, what I claim as new and desire to secure by Letters Patent, is:—

1. In a friction clutch, shafts to be coupled together, complementary peripherally engaging clutch devices secured on said shafts respectively, and a floating journal bearing for one of said shafts, with means for balancing the weight of said shaft to maintain the alinement of the clutch devices.

2. In a friction clutch, shafts to be coupled together, complementary peripherally engaging clutch devices secured on said shafts respectively, and a floating journal bearing for one of said shafts, a movable support therefor, and means for holding said support in position to maintain the alinement of said clutch devices.

3. In a friction clutch, shafts to be coupled together, complementary peripherally engaging clutch devices secured on said shafts respectively, and a floating journal bearing for one of said shafts, a movable support therefor, and a weight for holding said support in position to maintain the alinement of said clutch devices.

4. In a friction clutch, shafts to be coupled together, complementary peripherally engaging clutch devices secured on said shafts respectively, and a floating journal bearing for one of said shafts, a lever for supporting said journal bearing, and a weight operating on said lever to maintain the alinement of said clutch devices.

5. In a friction clutch, shafts to be coupled together, a rim or band secured to one shaft and a split band secured to the other shaft adapted to be expanded to frictionally engage the rim for coupling the two shafts together, a floating journal bearing for one shaft, a movable support therefor, and means for holding said support in position to maintain the alinement of said clutch devices.

6. In a friction clutch, shafts to be coupled together, a rim or band secured to one shaft and a split band secured to the other shaft adapted to be expanded to frictionally engage the rim for coupling the two shafts together, a floating journal bearing for one shaft, a movable support therefor, and a weight for holding said support in position to maintain the alinement of said clutch devices.

7. In a friction clutch, shafts to be coupled together, a rim or band secured to one shaft and a split band secured to the other shaft adapted to be expanded to frictionally engage the two shafts together, a floating journal bearing for one shaft, a lever for supporting said journal bearing, and a weight operating on said lever to maintain the alinement of said clutch devices.

8. In a friction clutch, shafts to be coupled together, a rim or band secured to one shaft and a split band secured to the other shaft adapted to be expanded to frictionally engage the rim for coupling the two shafts together, a floating journal bearing for one shaft, said bearing provided with a depending stem, a casting secured to the frame into which said stem extends, a lever pivoted on said casting with its ends extending into the pathway of said stem, and a weight adjustable along said lever to sustain the journal bearing in proper position to maintain alinement for the clutch devices.

CHARLES SEYBOLD.